(12) United States Patent
Laurent et al.

(10) Patent No.: US 8,354,648 B2
(45) Date of Patent: Jan. 15, 2013

(54) DEVICE FOR LOCATING AND IMAGING GAMMA OR X-RADIATION SOURCES

(75) Inventors: Philippe Laurent, Bures sur Yvette (FR); Olivier Limousin, Palaiseau (FR)

(73) Assignee: Commissariat a l'Energie Atomique, Paris (FR)

( * ) Notice: Subject to any disclaimer, the term of this patent is extended or adjusted under 35 U.S.C. 154(b) by 611 days.

(21) Appl. No.: 12/305,811

(22) PCT Filed: Jun. 11, 2007

(86) PCT No.: PCT/FR2007/000965
§ 371 (c)(1),
(2), (4) Date: Mar. 15, 2010

(87) PCT Pub. No.: WO2007/147957
PCT Pub. Date: Dec. 27, 2007

(65) Prior Publication Data
US 2010/0177869 A1      Jul. 15, 2010

(30) Foreign Application Priority Data
Jun. 20, 2006  (FR) .................................. 06 05460

(51) Int. Cl.
*G01J 1/42*          (2006.01)
(52) U.S. Cl. .................... 250/393; 250/395; 250/363.04
(58) Field of Classification Search .................. 250/393, 250/336.1, 395, 363.02, 363.06
See application file for complete search history.

(56) References Cited

U.S. PATENT DOCUMENTS
| | | | |
|---|---|---|---|
| 5,606,165 A * | 2/1997 | Chiou et al. | 250/363.06 |
| 2004/0084624 A1 | 5/2004 | Meng et al. | |
| 2009/0297058 A1 * | 12/2009 | Hoctor et al. | 382/274 |

OTHER PUBLICATIONS
International Search Report and Written Opinion for PCT/FR2007/000965 filed Jun. 11, 2007.
Segreto, A: "Performance of the IBIS Compton Mode"; Proc SPIE Int Soc Opt Eng; Proceedings of SPIE—The International Society for Optical Engineering; UV and Gamma-Ray Space Telescope Systems 2004; vol. 5488, No. PART 2, 2004, pp. 738-749; XP002455888.
Smith L E et al: "Hybrid collimation for industrial gamma-ray imaging: combining spatially coded and Compton aperture data"; Nuclear Instruments & Methods in Physics Research, Section—A: Accelerators, Spectrometers, Detectors and Associated equipment, Elsevier, Amsterdam, NL, vol. 462, No. 3; Apr. 21, 2001. pp. 576-587; XP004239346.
Forot et al: "Compton telescope with coded aperture mask: Application to the Integral/IBIS Compton mode"; Nuclear Instruments & Methods in Physics Research—Section—A: Accelerators, Spectrometers, Detectors and Associated Equipment, Elsevier, Amsterdam, NL; vol. 567, No. 1; Nov. 1, 2006; pp. 158-161; XP005720415.

* cited by examiner

*Primary Examiner* — Edwyn Labaze
(74) *Attorney, Agent, or Firm* — Alston & Bird LLP (57) ABSTRACT

Device for locating and imaging gamma or X-radiation sources, comprising: (a) a detection assembly comprising at least two gamma or X-radiation detectors sensitive to position, as well as a coded mask made of a radiation opaque material; and (b) electronic means for processing the electrical pulses provided by said detectors, so as to locate the source and form a bi- or tri- dimensional image thereof. The device is characterized in that the electronic means are suitable for reconstructing a bi- or tri- dimensional image of an X or gamma radiation source by applying a data processing method which combines the principles of Compton imaging and coded-mask imaging.

14 Claims, 4 Drawing Sheets

DEVICE FOR LOCATING AND IMAGING GAMMA OR X-RADIATION SOURCES

CROSS REFERENCE TO RELATED APPLICATIONS

This application is a national stage application filed under 35 U.S.C. 371 of International Application No. PCT/FR2007/000965, filed Jun. 11, 2007, which claims priority from French Patent Application No. 06 05460, filed Jun. 20, 2006.

FIELD AND BACKGROUND OF THE INVENTION

The present invention relates to a device for localizing and two- or three-dimensional imaging of sources of gamma and/or X-rays.

The invention is applicable in particular to the following fields:
- nuclear medicine;
- monitoring nuclear power stations;
- monitoring ports, stations, airports;
- more generally, combating the smuggling of radioactive materials; and
- radiography and non-destructive inspection.

Reference can be made to the following documents:

[1] Mise en oeuvre et étude des propriétés spectrales de la gamma-caméra ISGRI [Implementation and study of the spectral properties of the ISGRI gamma camera], thesis presented and supported by Olivier Limousin on Nov. 27, 2001;

[2] The basic component of the ISGRI CdTe gamma-ray camera for space telescope IBIS on board the INTEGRAL satellite, by O. Limousin et al., Nuclear Instruments and Methods in Physics Research A 428 (1999) 216-222;

[3] Polycell: the elementary detection unit of the ISGRI CdTe & gamma-ray camera, by O. Limousin et al., Nuclear Instruments and Methods in Physics Research A 458 1-2 (2001) 551-557;

[4] A basic component for ISGRI, the CdTe gamma camera on board the Integral satellite, by M. Argues et al., IEEE Transactions on Nuclear Science, Vol. 46, No. 3, 1999, 181-186;

[5] The ISGRI CdTe gamma-ray camera: first steps, by O. Limousin et al., Nuclear Instruments and Methods in Physics Research A 442 (2000) 244-249; and

[6] Qualification model of the space ISGRI CdTe gamma-ray camera, by O. Limousin et al., Nuclear Instruments and Methods in Physics Research A 471 (2000) 174-178.

For imaging or spectro-imaging in the gamma or X-ray range from about 20 kiloelectron volts (keV) to 2 megaelectron volts (MeV), known detector systems generally make use of one of the three following techniques: coded mask imaging; "Compton" imaging; and gamma or X-ray focusing.

Coded mask imaging consists in recording on a position detector that is sensitive to gamma or X-ray photons, the shadow of a mask that is partially opaque to said photons and that presents a pattern that is known, the mask being illuminated by the gamma or X-ray source that is to be detected and localized. The position detector samples the shadow that is cast. The position of the source is reconstituted by calculation.

It is not necessary to record the energy given up by the gamma or X-ray photons in order to constitute the image, and that technique does not give information about energy. In contrast, it can be applied over very wide spectral ranges. Nevertheless, it is generally restricted to low energies, less than 1 MeV.

Its main advantages lie in good angular resolution, and in background noise being automatically subtracted, thereby improving sensitivity (i.e. improving the ratio of signal (source) over noise (environment)). Angular resolution can typically be of the order of a few minutes of arc. It is unvarying and depends on the size of the mask elements, on the capacities of the position detector to sample said elements, and on the distance between the mask and the detection plane.

Coded mask imaging systems present a height lying in the range a few centimeters to a few meters. Their field of view is restricted to a few degrees or a few tens of degrees.

The "Compton" imaging technique makes use of at least two gamma or X-ray detectors that are capable of recording the positions of interactions between an incident gamma or X-ray photon and the detectors, together with the energies given up by said photon in those positions.

The principle of this technique relies on the fact that a gamma or X-ray photon having sufficiently high incident energy presents a high probability of giving up only a fraction of that energy to an electron that is bound to the atoms of the first detector it encounters as a result of an inelastic impact, after which it diffuses towards the second detector where it gives up all or some of its residual energy.

The angle of diffusion is associated with the energy of the incident photon and with the amount of energy it gives up during its interaction with the first detector.

A "Compton" system is a spectro-imager. In such a system, the direction of the incident photon and thus the position of the emitting source are reconstituted by calculation. The angular resolution of the system and the accuracy of localization depend on the accuracy with which energy is measured and on measurement statistics (exposure time and flux from the source).

In a "Compton" system that is ideal, i.e. that provides "perfect" spectrum measurement, angle resolution is always limited by the "Doppler enlargement" effect: the diffusion angle suffers from uncertainty associated with the fact that the electron on which the photon diffuses is not at rest at the time of the impact. Angular resolution is therefore limited to about 2° to 30°.

Furthermore, "Compton" systems have a field of view that is very extended, potentially $4\pi$ steradians. The limit on the sensitivity of this type of imager comes from the processing of fortuitous coincidences that have nothing to do with Compton diffusion. In addition, such systems are compact and can be of dimensions that are as small as a few centimeters.

The principle of a spectrometric imager using gamma or X-ray focusing is based on using a gamma or X-ray lens that is fitted with crystals on which gamma or X-ray photons are diffused (Bragg diffusion).

The angular resolution of such an imager is excellent, being equal to about 1 minute of arc, however the imager is limited by a focal length that is gigantic, depending strongly on the energy of the incident photons and being equal to about 15 meters (m) at 122 keV and about 80 m at 511 keV.

In addition, imaging is direct but limited to a narrow spectral range, and the field of view of a system of this type is minuscule: it covers a few minutes of arc. Applications of the gamma or X-ray focusing technique are therefore mostly limited to astronomy.

The three techniques outlined above can be used for determining the energy and the angular localization of sources that are situated at a great distance, practically at infinity. As a result, the corresponding detection systems find their main applications in high energy astronomy.

In addition, all of those systems are either bulky or limited in terms of spectral band width, or else they provide low performance in terms of angular resolution at high energy. Furthermore, they are well adapted only to two-dimensional localization of gamma or X-ray sources that are assumed to be "at infinity", i.e. at a distance that is at least eight times longer than the height of the telescope incorporating a system using any one of three types considered above.

Document GB 2 293 742 describes a gamma camera based on the principle of coded mask imaging and it enables a source of gamma radiation situated at a finite distance to be localized in three dimensions. The distance of the source from the camera is determined by analyzing the enlargement of the shadow of the coded mask that is projected by said source on the detector. The sensitivity of such a camera is found to be insufficient for detecting a weak gamma source presenting radiation of flux that is of the same order of magnitude as background noise, or even less.

The ISGRI gamma telescope is based on the coded mask technique, however it includes two detectors in parallel planes: consequently, at least in principle, it could be used in Compton mode. In reality, as shown in the article "Performance of the IBIS Compton mode", SPIE 2004, 5488 page 738, by A. Segreto, the performance of the IBIS telescope in Compton mode is not satisfactory because of its low immunity to background noise.

SUMMARY OF THE INVENTION

An object of the present invention is to remedy the above drawbacks by proposing a device that enables sources of gamma or X-rays to be localized in two or three dimensions and that enables an image to be formed thereof, and that can do this even in the presence of a signal-to-noise ratio that is very small.

According to the invention, such an object is achieved by a device according to claim 1.

Claims 2 to 13 relate to embodiments of the invention.

BRIEF DESCRIPTION OF THE DRAWINGS

The present invention can be better understood on reading the following description of embodiments given purely by way of non-limiting indication and with reference to the accompanying drawings, in which.

MORE DETAILED DESCRIPTION

A device in accordance with the invention combines the coded mask imaging technique with the "Compton" imaging technique.

The device makes use simultaneously of a "Compton" detection system comprising at least two radiation detectors, together with a coded mask placed in front of the sensitive surface one of the detectors.

The response of the device of the invention offers the advantages of the good angular resolution of the coded mask over the entire spectral range of the "Compton" detection system, and of conserving medium angular resolution over a very wide field. In addition, the combined use of the Compton and coded mask techniques enables the signal-to-noise ratio to be significantly improved.

The present invention overcomes the limitations of prior devices and makes the following possible:

accurately localizing in two or three dimensions one or more point sources of radiation over a broad spectral range (20 keV to 10 MeV for gamma rays or X-rays);

localizing one or more sources simultaneously in the field of view of the coded mask in three dimensions, i.e. determining the positions of radiation sources that are situated at finite distances and that might be different (the device provides a two-dimensional image of the sources together with the distance between itself and the sources);

localizing with resolution limited to 2° or 3° one or more extended or point sources over a broad spectrum range from about 50 keV to 10 MeV for gamma rays or X-rays (the term "extended source" is used to mean a source of angular dimensions greater than about five times the resolution of the coded mask);

determining the distance between the device and one or more point or extended sources that might be situated at different distances from the device;

measuring the energy of each incident photon individually;

measuring the energy spectrum of the source(s) in a vast range going from a few keV to a few MeV for gamma rays or X-rays;

determining the arrival time of each photon;

determining the flux from the detected point source(s);

accurately determining the flux from the or each point or extended source by appropriate processing of fortuitous coincidences for reconstructing photons detected during Compton diffusion; and determining the variation in the flux from the detected source(s).

The invention takes advantage of the compactness of "Compton" systems and of coded mask systems.

A device in accordance with the invention has at least two plane detectors that preferably present high spatial and spectral resolutions, working in coincidence and associated with a coded mask that enables the image of a "Compton" take to be refined, and optionally that enables the position of the source and its distance from the device to be determined.

This makes it possible to obtain a map in two or three dimensions of the observed sources. This ends up by providing a two- or three-dimensional gamma and/or X-ray camera.

Furthermore, in order to fabricate the detectors used in the invention, it is preferable to use a technology that enables them to be operated at ambient temperature, thereby firstly simplifying implementation and secondly enabling the weight and the size of the camera to be optimized so as to be transportable.

Associating such detectors with highly integrated electronic circuits of the application specific integrated circuit (ASIC) type obtains power consumption that is moderate, and makes it possible for the camera to be made portable and battery powered.

Furthermore, the camera can be made capable of working in a noisy medium, e.g. a nuclear power station, without significant loss of sensitivity.

This can be done conventionally by adding shielding (e.g. made of lead, tungsten, or other heavy metals) or else by processing that is specific to Compton measurements and that is described below. The shielding has the effect of reducing the observation angle of the camera, whereas the processing specific to Compton measurements does not have that drawback. The invention can use one or other of those techniques for obtaining protection against noise, or it can use an association of both of them.

Figure 1:
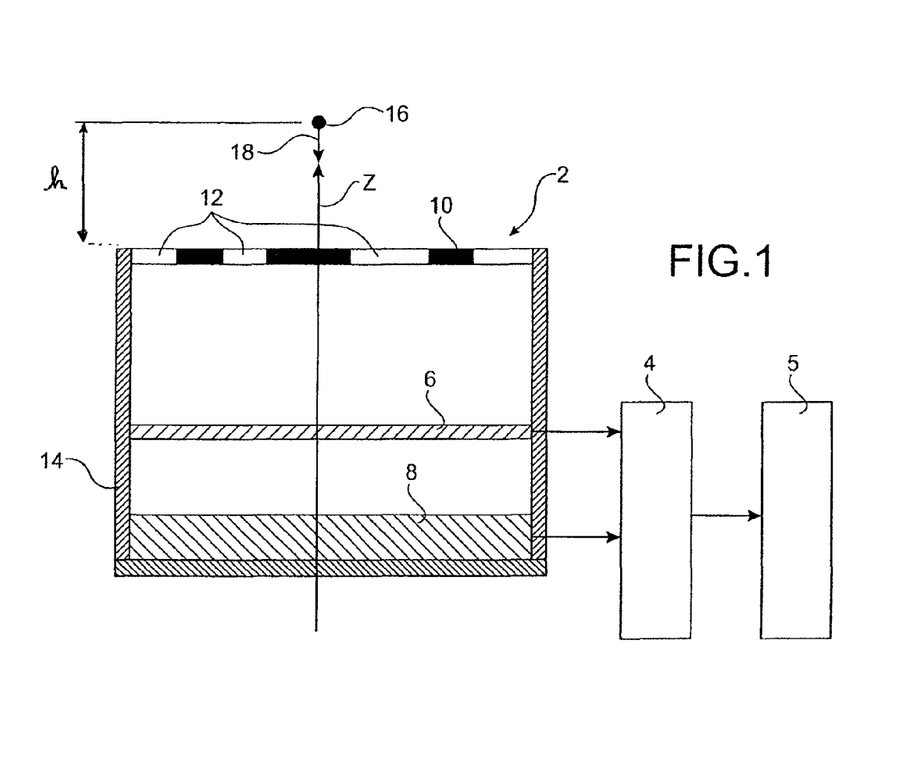
FIG. 1 is a diagrammatic view of a particular embodiment of the device of the invention.

FIG. 1 is a diagrammatic view of a device in accordance with the invention. The device is for localizing sources of radiation in three dimensions.

The device comprises a detector assembly 2 and electronic processor means 4 that are provided with means 5 for displaying the results they provide.

The device of the invention differs from the IBIS telescope essentially in its electronic processor means 4 that enable a novel imaging method to be implemented, advantageously in combination with the "Compton" and "coded mask" techniques.

The detector assembly 2 comprises a first detector 6 suitable for detecting radiation, and a second detector 8 also suitable for detecting the same radiation. The detectors are sensitive to position. Advantageously, they are plane and mutually parallel, but this is not an essential condition.

Each of the detectors is suitable for providing an electric pulse on receiving a photon of radiation, the electric pulse being representative of the energy of the photon and of the position of its impact on the detector that receives it.

The detector assembly 2 also comprises a coded mask 10 that is made of a material that is opaque to radiation. This coded mask 10 is pierced by apertures 12 in a predefined pattern; it is placed in register with the first detector 6 that lies between the coded mask 10 and the second detector 8.

Advantageously, the coded mask 10 is plane and parallel to both detectors 6 and 8, however this likewise is not an essential condition.

The device also includes shielding 14 described in greater detail below.

The device is for localizing a source 16 that emits radiation 18 (X-rays and/or gamma rays). To do this, the device is pointed towards the source. This pointing is described in greater detail below.

The axis Z of the device is then pointed towards the zone where the source is to be found.

The source 16 casts a shadow cast of the coded mask 10 on each of the first and second detectors 6 and 8. The first and second detectors 6 and 8 then generate respective first and second images in electrical form of this shadow that has been cast thereon.

The electronic processor means 4 are designed to process the electric pulses that are delivered by the first and second detectors in order to localize the source 16.

In accordance with the invention, the electronic processor means 4 select the electric pulses that are delivered respectively by the first and second detectors 6 and 8 and that coincide in time. These pulses in time coincidence can be representative of a Compton diffusion event of a photon on one of the detectors, followed by the photon being absorbed by the other detector. It is important to observe that Compton diffusion can take place forwards, in which case the photon interacts initially with the first detector 6 and then with the second detector 8 (this is the situation shown in FIG. 3, and is the most frequent for photons of energy greater than or equal to 1 MeV), or else backwards, in which case the photon interacts initially with the second detector 8 and then with the first detector 6. It is assumed that it is possible to distinguish between these two families of events: the description below embarks on the technique for data processing that enables this distinction to be made.

For reasons of simplicity, the description below ignores the possibility of a photon being subjected to double Compton diffusion as opposed to being absorbed by one or other of the detectors: these events merely contribute to background noise.

After selecting electric pulses that are in time coincidence, the electronic processor means uses Compton imaging to obtain a preliminary estimate of the angular position and of the angular distribution of the source 16 of gamma or X-rays, assuming that it is located at an infinite distance from the detector assembly 2.

Compton imaging is a technique that is well known (see for example reference [1]). Nevertheless, its principle is set out below with reference to FIG. 3.

Figure 3:
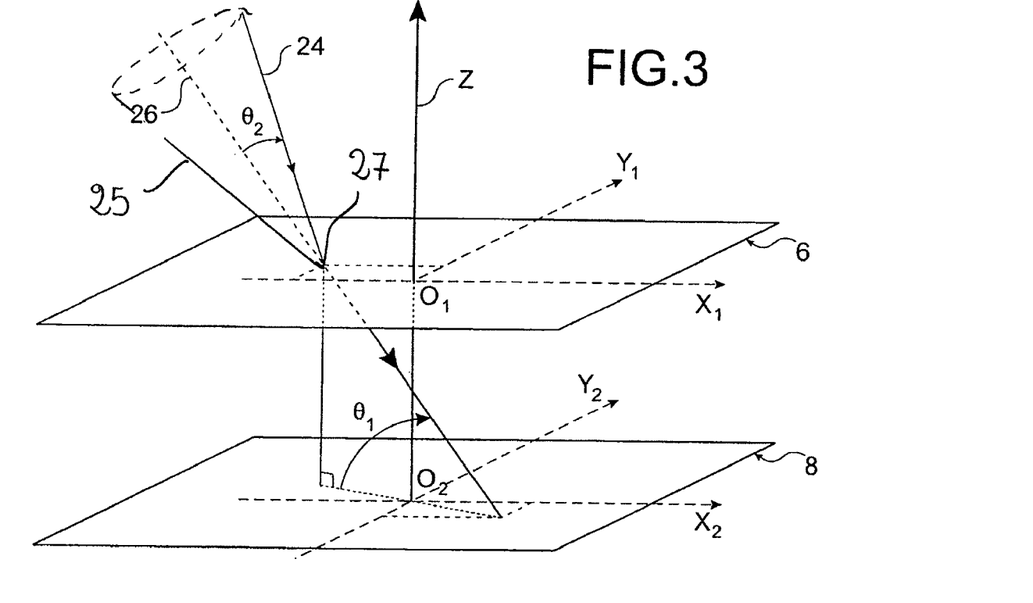
FIG. 3 is a diagram showing the principle of Compton imaging that is used in the FIG. 1 device.

In FIG. 3, the planes of the detectors are again referenced 6 and 8. The axis of the device is again referenced Z. This Z axis is orthogonal to the detector planes 6 and 8. A frame of reference $O_1X_1Y_1Z$ is defined in which the point $O_1$ belongs to the detector plane 6 and the axes $X_1$ and $Y_1$ lie in said detector plane 6 and are perpendicular to each other and to the Z axis.

A frame of reference $O_2X_2Y_2Z$ is also defined where the point $O_2$ lies in the detector plane 8 and the axes $X_2$ and $Y_2$ are situated in this detector plane and are perpendicular to each other and to the Z axis.

The localization of a source is determined by studying events that coincide between the two plane detectors 6 and 8. This study is based on the Compton effect whereby a photon of radiation gives up energy in the first detector 6, is deflected, and then gives up the remainder of its energy in the second detector 8.

Initially, the angle $\theta_2$ between the direction 24 of the incident photon and the direction 26 of the photon diffused between the two plane detectors is deduced by accurately measuring the energy given up in each of the two plane detectors. For calculating the angle $\theta_2$, reference can be made to the following document:

[9] Gamma-ray burst detection and localization capabilities of the IBIS/INTEGRAL telescopic Compton mode, R. Marcinkowski et al. Il Nuovo Cimento 28 (2005) 845.

Thereafter, the angle $\theta_1$ between the planes of the detectors of the device and the direction 26 of the diffused photon is measured by having accurate knowledge of the respective points of impact in the two plane detectors. In each detector, the point of impact corresponds to a pixel of the detector. The angle $\theta_1$ is given by the following formula:

$$\theta_1 = \arctan([((x_2-x_1)^2+(y_2-y_1)^2)^{1/2}]/d)$$

where $x_1$ and $y_1$ are the coordinates of the point of impact in the detector 6, and $x_2$ and $y_2$ are the coordinates of the point of impact in the detector 8.

The direction 24 of the photon source 16 relative to the Z axis of the device, enabling the two-dimensional image to be reconstructed, and the distance between the device and the source, are obtained by statistically analyzing the angles $\theta_1$ and $\theta_2$ for each selected photon.

Since the direction of an incident photon lies on the cone 25 of axis 26 and of half-angle at the apex $\theta_2$ ("the Compton diffusion cone"), the direction 24 of the source is calculated as the intersection of all the cones 25 that are associated with each selected photon.

The fact of assuming that the source 16 is situated at an infinite distance considerably simplifies the processing of the data. Under such circumstances, it is possible to ignore the offsets between the apexes 27 of the cones 25, and the problem is reduced to determining the intersection between a plurality of cones having apexes that coincide on the surface of a sphere representing the celestial sphere. This is equivalent to determining the intersections of the Compton diffusion cones on a sphere of infinite radius.

This Compton imaging step serves to determine a preliminary image in two dimensions of the source 16, i.e. to give an estimate of its position and angular distribution. The image presents relatively poor angular resolution)(2°-3°) because of the intrinsic limitations of the Compton technique, but it nevertheless enables one or more gamma or X-ray sources to be identified in the field of view of the camera.

Thereafter, the electronic processor means 4 select from amongst the electric pulses that are in time coincidence those pulses, as seen in this low resolution "Compton" image, that are likely to represent photons coming from said source (16).

At this point, the electronic processor means 4 perform a deconvolution relative to the pattern of the mask 10 for the first image or for the second image or for both of them. In other words, they reconstruct an image of the source 16 using the coded mask technique.

However this reconstruction is performed while taking account only of the selected pulses that correspond to photons that are capable of representing photons coming from said source (16).

This synergy between the Compton imaging technique that enables preliminary identification of the source and "useful" photons to be selected, and the coded mask imaging technique that enables good angular resolution to be achieved serves significantly to improve the signal-to-noise ratio in the image that is obtained.

Furthermore, advantage is also taken from the fact that the Compton field of view is much larger than the field of view associated with the coded mask technique. Thus, if the source 16 identified by the Compton imaging lies outside the field of view of the camera (defined relative to coded mask mode), then use can be made of this information to repoint said camera in the direction of the source.

The coded mask imaging technique is itself well known. Nevertheless it is summarized below with reference to FIG. 2. For reasons of simplicity, it is initially assumed that one point source is situated at an infinite distance from the detector assembly 2.

Figure 2:
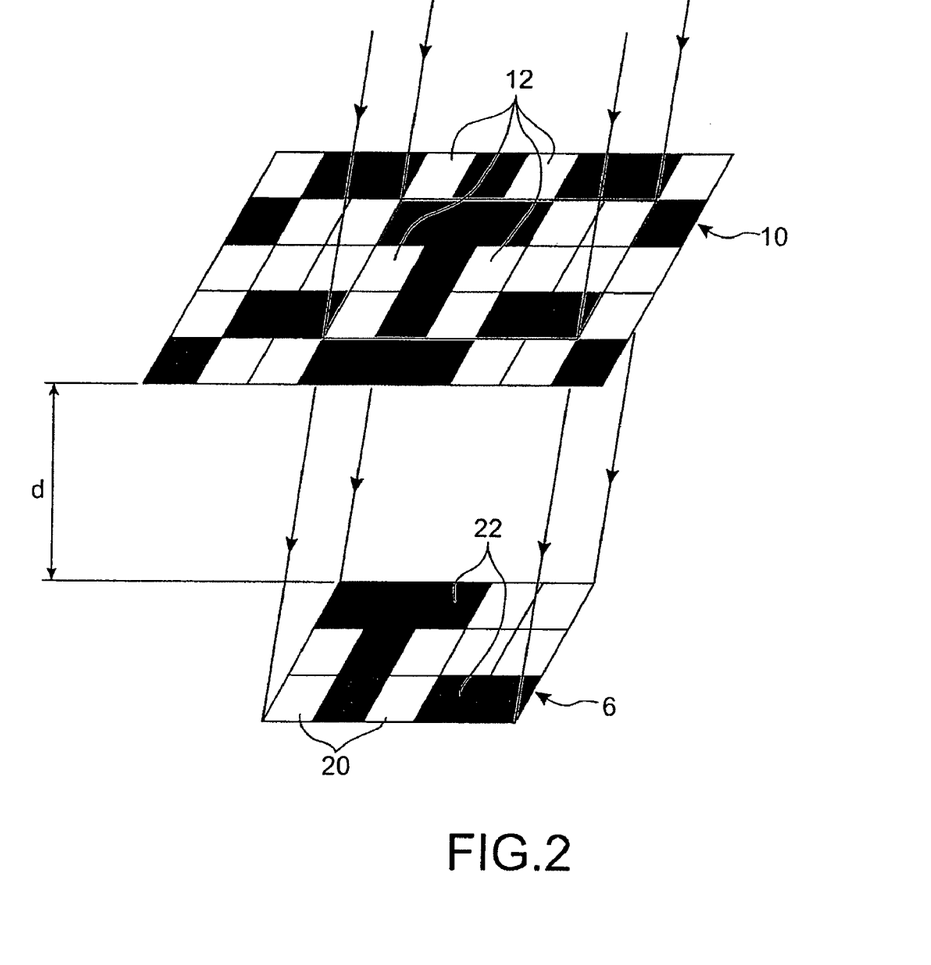
FIG. 2 is a diagrammatic perspective view of the coded mask of a detector forming part of the FIG. 1 device.

The term "point source" is used to mean a source of size that is smaller than the resolution of the detector apparatus constituted by the detector 6 and the mask 10. Resolution is a parameter that depends on the size of the apertures 12 in the mask, on the size of the pixels of the detector 6, and on the distance d between the detector 6 and the mask 10.

The coded mask is constituted by a plate of material that is opaque to the radiation (e.g. made of lead, tantalum, or tungsten) and that is pierced by apertures 12 in a predefined pattern. On being exposed to a source of radiation, a fraction of the radiation is stopped by the opaque material of the mask, while another fraction passes through the apertures and generates a pattern on the detector plane, which pattern is made up of light zones 20 and dark zones 22. This pattern is associated directly with the direction of the source.

Given the known coding of the mask and of the pattern as received on the detector plane, it is possible to determine accurately the direction of a point source in the field of view by appropriate computer processing.

This processing consists essentially in performing deconvolution in two dimensions on the first image or the second image or both images relative to the pattern of the coded mask 10. Specifically, this deconvolution consists in searching for all or part of the pattern of the mask 10 in said images. Given the pattern that is selected for the mask, any position of the source 16 corresponds to only one possible pattern for the cast shadow 22. The best correlation between all or part of the pattern of the mask 10 and the cast shadow 22 as recorded by the detectors 6 and 8 gives the direction of the source 16.

For more information on this technique, reference can be made to the following documents:

[7] The INTEGRAL IBIS/ISGRI system point spread function and source location accuracy, by A. Gros et al., Astronomy and Astrophysics 411 (2003) L179;

[8] INTEGRAL/IBIS scientific data analysis, by A. Goldwurm et al., Astronomy and Astrophysics 411 (2003) L223; and above-cited document [1].

It is specified that the grid present on the mask 10 of FIG. 2 corresponds to the pattern of the coded mask 10 (the elements that are opaque to radiation are shown black and the elements 12 that are transparent to radiation are shown white), and the grid present on the detector 6 of FIG. 2 corresponds to the shadow 22 of the coded mask as cast by the radiation source 16 on the detector 6.

Figure 4:
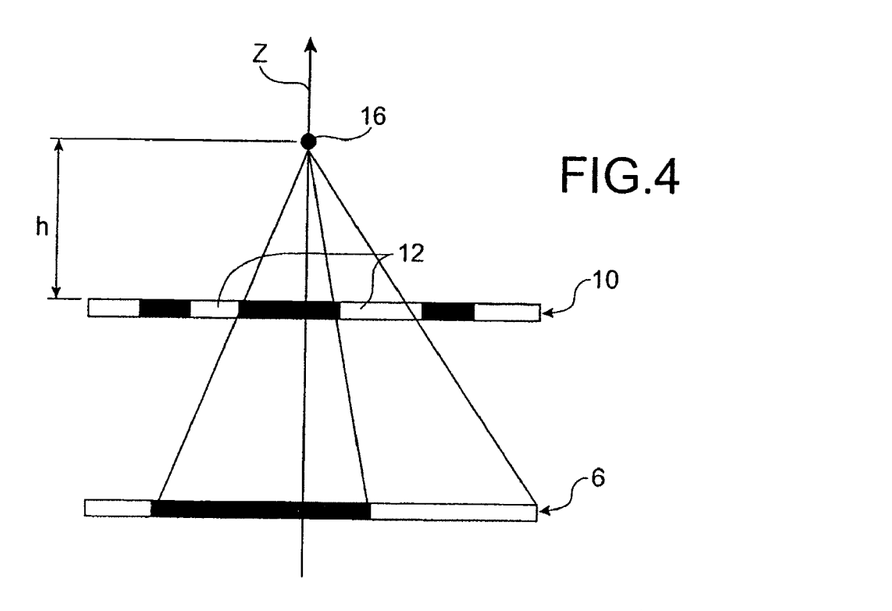
FIG. 4 is a diagrammatic view of the coded mask and one of the detectors forming part of the FIG. 1 device.

Consideration is given below to a source 16 that continues to be point source, but that is situated at a finite distance h from the detector assembly 2 (more precisely from the mask 10). FIG. 4 represents such a situation. In this figure, the source 16 is shown as being on the Z axis of the camera, however the technique also applies to a source that is not on the axis.

As can be seen in FIG. 4, when the source 16 is at a finite distance from the mask 10, the shadow of the mask on the detector 6 (and on the detector 8) is enlarged. The distance h can be deduced by analyzing the enlargement of the image of the pattern of the mask 10 on the detector 6 and/or on the detector 8.

By making use of the difference enlargements of the patterns of the mask as recorded on the two plane and mutually parallel detectors, it is possible to improve the accuracy of the measurement of the distance to the source, given that these are independent and multiple measurements of the same parameter. A first possibility consists in evaluating the distance h by measuring the enlargement of the pattern of the $\overline{mask}$ 10 separately on both detectors; these two evaluations are then averaged so as to improve accuracy. Another possibility consists in making use solely of the difference in enlargement between the images provided on the two detector surfaces in order to evaluate the distance to the source by triangulation, given that the distance $\underline{d}$ between these two detector surfaces is known.

Specifically, both the direction and the distance of the source are determined simultaneously by performing two-dimensional deconvolution on the first image or of the second image or of both images relative to a plurality of enlarged replicas of the coded mask 10 presenting different enlargement coefficients. The enlargement that serves to reconstruct the sharpest image is selected, and the distance $\underline{h}$ to the source 16 is deduced therefrom.

Since convolution and deconvolution operations are linear, the coded mask imaging method is also applicable to circumstances when there are one or more sources, including extended sources. However, the farther circumstances become removed from an isolated point source, the greater the amount of noise that affects the reconstituted image. That is why it is important to reduce noise by selecting "useful" photons by the Compton technique.

In spite of that, determining the position of the source 16 by coded mask imaging is inevitably affected by indetermination, and this can be quantified. The indetermination can be reduced by having recourse again to Compton imaging.

If it is not assumed that the source is situated at an infinite distance, then Compton imaging makes it possible, at least in principle, to localize a radiation source in three dimensions by determining the point of intersection between the various cones 25 constituted by all possible arrival directions 24 of the different photons. This time the intersection is determined without bringing the apexes 27 of the cones 25 to a common point, since it is no longer assumed that the source 16 is at infinity. Naturally, because of measurement errors, the cones 25 do not all intersect at a single point, and the localization of the source suffers from a significant amount of uncertainty.

In itself, three-dimensional Compton imaging presents accuracy that is not very satisfactory. However, in the invention, it is possible to take advantage of the approximate knowledge concerning the distance to the source that is provided by the deconvolution of the pattern of the mask 10. To do this, the procedure is as follows:

The preceding coded mask imaging step has provided a first estimate of the distance h to the source 16 relative to the detector assembly 2, together with the uncertainty of this first estimate. It is possible to deduce therefrom a lower limit $h_{min}$ and an upper limit $h_{max}$ for said distance.

Thereafter, a plurality of test values $h_{test}$ are determined for the distance to the source 16, these test values lying in the range $h_{min}$ to $h_{max}$.

For each test value $h_{test}$, Compton imaging is used to determine a test estimate of the angular position and of the angular distribution of the source 16. This test estimate is obtained by determining the point of intersection of the projections of the Compton diffusion cones on a sphere of radius $h_{test}$ and of center coinciding with the center of the detector assembly 2.

Each test estimate is performed with uncertainty due to the fact that in reality all of the cone projections do not intersect at a single point. This uncertainty can be determined.

At this point, a second approximation for the distance h is selected as being the test value $h_{test}$ that provides the test estimate having the lowest uncertainty. In turn, this test estimate is selected as a second estimate of the angular position and of the angular distribution of the source 16.

The second estimation of the distance h, provided by three-dimensional Compton imaging may possibly have better accuracy than the coded mask estimate. As for position, the best value is retained.

The accuracy of the second estimate for the angular position and the angular distribution of the source 16 may be better than or worse than the accuracy of the first estimate as provided by deconvolution of the pattern of the mask 10. The uncertainty affecting these two estimates can be calculated by techniques that are themselves known: it is thus possible to retain the estimate for which said uncertainty is the smaller.

It is also possible subsequently to refine the estimates of the position, the distance, and the angular distribution of the source 16 by making use of an iterative method. The processing described above can be repeated using as the preliminary estimate for selecting "useful" events, the best estimate obtained during the preceding iteration.

Figure 5:
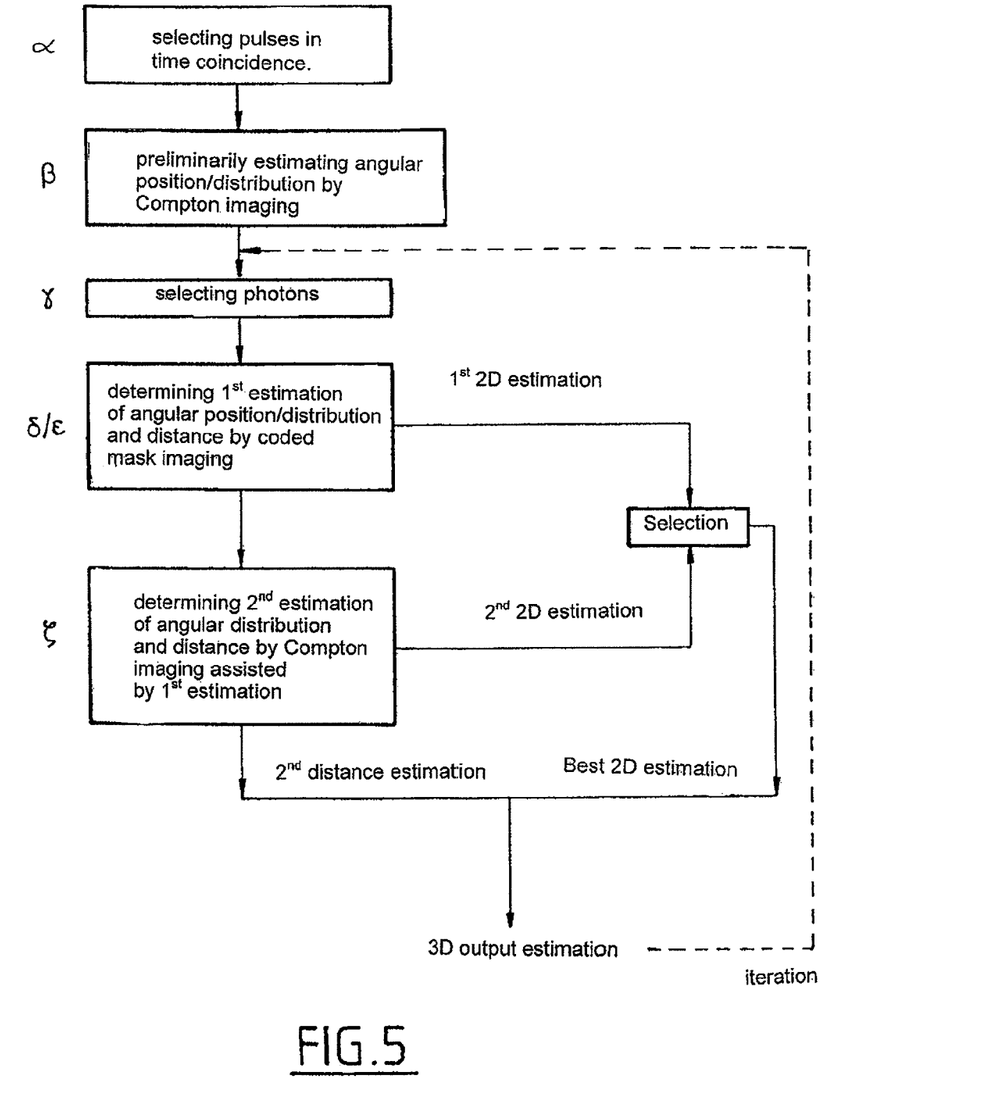
FIG. 5 is a flow chart of an imaging method implemented by the device of the invention.

The flow chart of FIG. 5 gives an overall view of the data processing method implemented by the electronic processor means 4.

Step α comprises selecting electric pulses delivered by the first and second detectors that are in time coincidence. These pulses are capable of representing a Compton diffusion event of a gamma or X-ray photon on one of the detectors, followed by absorption on the other detector.

Step β comprises using Compton imaging to determine a preliminary estimate of the angular position and the angular distribution of the gamma or X-ray source 16, assuming that it lies at an infinite distance from the detector assembly 2. In other words, this step comprises reconstructing a two-dimensional (2D) image by analyzing Compton imaging events. Optionally, this preliminary two-dimensional image can be used for changing the pointing of the detector assembly 2, supposing the identified source lies outside the field of view of said detection assembly when used in coded mask mode.

Step γ comprises selecting only those electric pulses that, in addition to being in time coincidence, are capable of coming from the source 16 as identified in the preceding step.

Step δ/ε comprises determining a first three-dimensional (3D) image of the source 16, i.e. a first estimate of its angular position, of its angular distribution, and of its distance. This step comprises a two-dimensional deconvolution of the first image or of the second image or of both images relative to the pattern of the coded mask 10 using the selected electric pulses, and estimating the distance h by analyzing the enlargement of the pattern of said mask 10.

Step ζ comprises determining a second three-dimensional image of the source 16, i.e. a second estimate of its angular position, its angular distribution, and its distance. This step is performed by Compton imaging assisted by knowledge of the first distance estimate as obtained in step δ/ε.

Thereafter, the uncertainty levels of the first and second estimates of the angular position and of the angular distribution of the source 16 are compared. The estimate presenting the least uncertainty is combined with the second distance estimate in order to provide an output three-dimensional image of the radiation source 16.

Optionally, this three-dimensional image as output can be input as a preliminary image in a new iteration of the method from step γ.

It is also possible to omit performing steps β and γ, however such a simplification is likely to degrade significantly the quality of the image of the source 16.

The electronic processor means 4 are also organized to determine the energy spectrum of the source 16 from the selected electric pulses. The device thus constitutes a spectro-imager.

This is done as follows: the selected pulses are classified by energy range, and the result is presented in the form of a histogram. The result of this classification is then compared with that of known radiation sources in order to identify their presence. The presence and the measurement of a plurality of peaks within the distribution enables a given radioactive source 16 to be identified.

The elimination of fortuitous events is considered below.

Certain events detected by the camera may fortuitously be in coincidence between the two detectors 6 and 8. Because these events are fortuitous, they have nothing to do with the source being studied and they decrease the sensitivity of the camera when producing the "Compton" image. This effect can be minimized by specific computer processing that takes advantages of the specific features of Compton measurement.

This processing can be as follows, for example:

Firstly, the proportion R of fortuitous coincidences is calculated, as given by the following formula:

$$R = \frac{(2\Delta T - \delta T)R_1 R_2}{1 + (2\Delta T - \delta T)R_1 R_2}$$

where:
$R_1$ and $R_2$ are the count rates of the first and second detectors respectively;

$2\Delta T$ is the width of the time window within which it is considered that two pulses are in time coincidence; and $\delta T$ is the time resolution of the data acquisition electronics.

Thereafter, a list of fortuitous pseudo-events is calculated by randomly associating all of the events recorded by both detectors in pairs. These pseudo-events are subjected to the same digital processing as the selected events (steps γ to ζ in FIG. 5). This produces a pseudo-estimate of the angular position and of the angular distribution of the source 16 of gamma or X-rays. This pseudo-estimate is then weighted with the calculated proportion of fortuitous time coincidences.

Finally, this weighted pseudo-estimate is subtracted from the image of the source obtained by digital processing. This produces an image of the source that has been "cleaned" of the noise due to fortuitous coincidences.

In addition, implementing this method makes it possible to estimate accurately the radiation flux from the source 16, even if the source is faint and immersed in a noisy environment.

Another source of noise and artifacts in the reconstitution of Compton images lies in the indetermination concerning the order in which each photon interacts with the first and second detectors. By way of example, FIG. 3 shows an event during which a photon interacts initially with the first detector 6, is diffused forwards (i.e. with a diffusion angle $\theta_2 < 90°$), and is then absorbed by the second detector 8. Nevertheless, the photon could equally well have gone through the first detector without interacting, and could have been diffused backwards ($\theta_2 > 90°$) by the second detector and be absorbed on its second passage through the first detector.

Compton diffusion equations provide different values for the diffusion angle $\theta_2$ depending on whether it is assumed that the diffusion took place forwards or backwards. More precisely, for forward diffusion the following applies:

$$\cos(\theta_2) = 1 - m_e c^2 \left( \frac{1}{E_2} - \frac{1}{E_1 + E_2} \right) \text{ with } \theta_2 < 90°$$

and for backward diffusion the following applies:

$$\cos(\theta_2) = 1 - m_e c^2 \left( \frac{1}{E_1} - \frac{1}{E_1 + E_2} \right) \text{ with } \theta_2 > 90°$$

where $E_1$ and $E_2$ are respectively the energy given up by the photon on the first detector 6 and on the second detector 8, $m_e$ is the rest mass of an electron, and c is the speed of light.

Normally, ambiguity is removed by assuming that all events correspond to forward diffusions, since that is the most frequent occurrence, in particular for photons of energy greater or equal to 1 MeV. However under such conditions, photons that are diffused backwards give rise to noise and artifacts.

An advantageous embodiment of the invention makes it possible to do better. In this embodiment, the cross-sections for forward Compton diffusion and for backward Compton diffusion are calculated for each pair of electric pulses in time coincidence. Thereafter the type of event is selected that is associated with the greater cross-section.

In a variant, a flexible decision technique is applied: in image reconstruction, use is made of the forward and backward Compton diffusion angles as determined, and each of those two possibilities is associated with a weighting coefficient that increases with increasing value for the corresponding cross-section. The limit condition, in which one coefficient is equal to 1 and the other to 0, corresponds to taking a "hard" decision as considered above.

The calculation of angles and cross-sections is applicable to the general case of a source situated beside the mask.

In known manner, the differential cross-section for Compton diffusion is given by the Klein-Nishina formula with $E_i$=incident E, i.e. the total energy $E_1 + E_2$, and with $E_d$=diffused E:

$$\frac{d\sigma}{d\theta_2} = \pi Z r_e^2 \sin(\theta_2) \left(\frac{E_d}{E_i}\right)^2 \left(\frac{E_d}{E_i} + \frac{E_i}{E_d} - \sin^2(\theta_2)\right)$$

where Z is the atomic number of the material constituting the detector on which diffusion took place; $r_e$ is the conventional radius of the electron ($2.82 \times 10^{-15}$ m); and $E_d$ is equal to $E_2$ for forward diffusion, and to $E_1$ for backward diffusion. The cross-section can be calculated for both circumstances.

This technique can also be applied to improve known Compton imaging methods in the prior art.

The technology of the two plane detectors is described below.

From the localization technique described above, it can be understood that the spatial resolution and the spectral resolution (accuracy of the measurement of the interaction position and accuracy of the measurement of the energy of the photons) are parameters that determine the performance of the device to the first order.

By using Compton data, the resolution of measurement provided by the device depends largely on the energy resolution of the detectors. It is therefore preferable to use pixelized semiconductor detectors with high spectral and spatial resolutions. These detectors may be made of CdTe, of silicon, or of germanium. For example it is possible to use an Si detector and a CdTe detector, or both detectors may be CdTe detectors.

By way of example, CdTe detectors have been developed that have high energy resolution and that can be used in the device of the invention. They provide spectral performance that is sufficient for finding sources at 1 with accuracy of 1 centimeter (cm), over a spectrum band that extends from about 200 keV to about 2 MeV for gamma or X-rays. On the top of these detectors, reference can be made to the following documents:

documents [1] to [6];

[10] 3D modeling of Cd(Zn)Te detectors for the SIMBOL-X space mission, by B. P. F. Dirks et al., High Energy Detectors in Astronomy, Proceedings of SPIE Vol. 5501, Glasgow (June 2004); and

[11] Leakage current measurements on pixelated CdZnTe detectors, by B. P. F. Dirks et al., Nuclear Instruments and Methods in Physics Research A (2006).

By way of example, it is possible to use detectors having pixels in the form of squares with side lying in the range 0.5 millimeters (mm) to 10 mm.

A few quantitative elements are set out below concerning the gamma or X-ray camera of the invention.

The distance between the two plane detectors is a parameter involved in detection sensitivity. It can be shown that sensitivity is optimized when the distance between the two plane detectors is of the same order of magnitude as the diagonal of said plane detectors.

The accuracy of the separation s of the coded mask for two sources situated in a plane perpendicular to the Z axis of the camera is such that:

$$s = \arctan(m/d)$$

which differs little from m/d in radians.

With a source photon signal-to-noise ratio N, the accuracy of localization l is given by:

$$l = s/N^{1/2} \text{ (in radians)}$$

In these formulas, m is the size of the smallest opaque elements of the mask 10, and d is the distance between the mask 10 and the first detector.

To obtain good sampling of the tiles of the mask with the detector 6 or with the detectors 6 and 8, it is preferable for the size of the smallest tiles of the mask to be not less than three times the size of the pixels of the detectors 6 and 8.

There follows by way of example a numerical application that is purely indicative and non-limiting:

the pixel size of the plane detectors is equal to 0.5 mm;
m is at least 1.5 mm;
d is 30 cm giving s=0.005 radians;
it is then possible to distinguish between two sources that are 5 mm apart from each other and at a range of 1 m from the device;
the accuracy of localization l is 1 mm for a signal-to-noise ratio equal to 25; and
by using Compton reconstruction, it is possible to determine the distance to a source that is situated 1 m from the device with accuracy of the order of 5 cm.

An example of a gamma/X-ray camera of the invention that is portable is described below.

Two detectors can be used, one of Si and the other of CdTe, with pixels having a side of 0.5 mm. It is then necessary to use a mask in which the apertures have a minimum size of 1.5 mm. For a camera to be portable, it is possible to envisage having two detectors presenting dimensions of 10 cm×10 cm, with a distance of 30 cm between the mask 10 and the first detector 6.

Such a device enables localization to be performed with accuracy of 1 cm at a distance of 1 m in (large field) "Compton" imaging mode, and of 1 mm at a distance of 1 m in coded mask imaging mode.

By adding means that make it possible to limit noise outside the field of view of the camera, it is possible to obtain a camera weighing about 10 kilograms (kg) to 15 kg, and that is easily transportable. The camera is of the kind shown diagrammatically in FIG. 1.

In the example shown in the figure, the means for limiting noise outside the field of view of the camera are walls 14 made of lead or tantalum that surround the assembly formed by the detectors 6 and 8 and the mask 10, and that also cover the face of the detector 8 that is not facing towards the detector 6, as can be seen in the figure.

Making detectors with multiple small pixels requires the use of very highly integrated electronic circuits (ASICS), thereby tending to limit electricity consumption to a very great extent. A single independent read channel for one pixel may consume as little as 1 milliwatt (mW) to 3 mW. For the device described by way of example, that corresponds to a total of 40 watts (W) to 120 W.

A camera having its dimensions scaled up prorata from the above-described camera has the same optical properties. A greater surface area for the detectors serves to obtain better sensitivity.

The above is therefore merely one possible example of a camera suitable for illustrating the invention. Other dimensions can be envisaged for satisfying other constraints in terms of localization accuracy, sensitivity, weight, and/or electricity consumption.

It is also specified that the pixelized detectors may comprise individual pixels or segmented electrodes.

Furthermore, it is specified that the device enables one or more sources that are present in the field of view of the coded mask to be located accurately and simultaneously, in three dimensions.

In addition, the device makes it possible to measure the energy of each incident photon. This is done as follows: each pixel of the device is associated with an analog electronic system that is capable of producing an electrical signal of pulse amplitude that is proportional to the energy given up by the photon in the pixel.

The device also makes it possible to determine the arrival time of each photon on each detector. Once a photon interacts with one of the detectors, its interaction is signaled to the read electronics by a fast digital signal. This signal is synchronized on a clock that enables accurate timing to be performed (typically to within 1 microsecond (μs) to 10 μs).

The device also makes it possible to determine the flux from the detected source(s).

The device also makes it possible to determine variation in the flux from the detected source(s).

In the elements of the invention described above, two radiation detectors are used. Nevertheless, it is possible to use more than two detectors in the invention in order to extend the energy range of the detector up to 10 MeV or even more.

Furthermore, in the examples described, attention has been given above all to localizing sources of gamma rays. However the invention also enables sources of X-rays and sources of X-rays and gamma rays to be localized, by selecting detectors that are appropriate for those types of radiation.

The invention claimed is:

1. A device for localizing and imaging sources of gamma or X-rays, the device comprising:
   a) a detector assembly comprising:
      at least two gamma or X-ray detectors, namely first and second detectors sensitive to position, each of the first and second detectors being suitable for providing an electric pulse on receiving a photon of radiation, the electric pulse being representative of the energy of said photon and of the position of its impact on the detector that receives it; and
      a coded mask made of a material that is opaque to the radiation and that is pierced by apertures in a predefined pattern, the coded mask being placed in front of the first detector, which first detector lies between the coded mask and the second detector, this relative positioning enabling first and second shadows to be obtained from a source that is to be localized, the shadows being cast on the first and second detectors that then generate respective first and second images in electrical form of said first and second cast shadows; and
   b) electronic means for processing the electric pulses delivered by the first and second detectors in order to localize the source and form a two- or three-dimensional image;
   wherein the electronic processor means are designed:
      (α) to select from amongst the electric pulses that are delivered respectively by the first and second detectors, those pulses that are in time coincidence and that are therefore for representing a Compton diffusion event of a gamma or X-ray photon on one of the detectors followed by absorption on the other detector;

(β) to use Compton imaging to determine a preliminary estimates of the angular position and of the angular distribution of the source of gamma or X-rays, assuming that the source is at an infinite distance from the detector assembly;

(γ) to select electric pulses in time coincidence that, from said preliminary estimates of the angular position of the angular distribution of the source of gamma or X-rays, are for representing photons coming from said source; and (δ) to deconvolute the first image or the second image or the first and second images relative to the pattern of the coded mask on the selected electric pulses so as to obtain first estimates of the angular position and the angular distribution of the source of gamma or X-rays, thereby constituting a two-dimensional image of said source.

2. A device according to claim 1, in which the electronic processor means are also designed:

(ε) to determine a first estimate of the distance of the source from the detector assembly by analyzing the enlargement of the image of the coded mask on at least one of the first and second detectors, to determine uncertainty for said first estimate, and to deduce therefrom an upper limit and a lower limit for the distance to the source; and (ζ) to determine second estimates of the angular position, of the angular distribution, and of the distance of the source from the detector assembly by three-dimensional Compton imaging, making use of the knowledge of said upper and lower limits.

3. A device according to claim 2, in which the electronic processor means are designed to determine said second estimates of the angular position, the angular distribution, and the distance of the source by:

(ζ1) determining a plurality of test values for the distance to the source, the test values lying between said lower limit and said upper limit;

(ζ2) using Compton imaging to determine test estimates of the angular position and of the angular distribution of the source in correspondence with each of said test values for its distance;

(ζ3) determining an uncertainty value for each of said test estimate; and (ζ4) selecting as second estimates of the angular position and of the angular distribution of the source, the test estimate associated with the smallest uncertainty, and as the second estimate for the distance to the source, the corresponding distance test value.

4. A device according to claim 2, in which the electronic processor means are also designed to select from the first and second estimates of the angular position and of the angular distribution of the source, those estimates that are associated with the smallest uncertainty, and combine them with the second estimate of the distance of the source in order to obtain a three-dimensional image of said source.

5. A device according to claim 4, in which the electronic processor means are also designed to implement an iterative method of processing data in which said three-dimensional image of the source is used to provide preliminary estimates of the position and the angular distribution of said source and of its distance, in order to select electric pulses in time coincidence that are for representing photons coming from said source, said method further including additional execution of the processing steps (δ), (ε), and (ζ) on the pulses as selected in this way.

6. A device according to claim 1, in which the electronic processor means are further designed:

(ι1) to calculate, for each pair of electric pulses in time coincidence, the forward Compton diffusion angle and the backward Compton diffusion angle as a function of the energy given up by the corresponding photon on the first detector and on the second detector, and also the relative impact position of said photon on said first and second detectors:

(ι2) to calculate, for each pair of electric pulses in time coincidence, the cross-section for forward Compton diffusion and the cross-section for backward Compton diffusion as a function of the energy given up by the corresponding photon on the first and second detectors, and also the corresponding Compton diffusion angle; and (ι3) to perform the Compton imaging step by making use for each pair of electric pulses in time coincidence, of the forward and backward Compton diffusion angles as determined in step (ι1), and to give each of these two possibilities a weighting coefficient that increases for increasing value of the corresponding cross-section.

7. A device according to claim 6, in which the weighting coefficient is 1 for the diffusion direction presenting the greater cross-section and 0 for the other diffusion direction.

8. A device according to claim 1, in which the electronic processor means are also designed:

(θ1) to calculate the proportion of fortuitous time coincidences that are present in the first and second images:

(θ2) to generate fortuitous pseudo-events by associating the events recorded by the two detectors in pairs and by subjecting them to the same processing as the selected pulses in order to obtain pseudo-estimates for the angular position and the angular distribution of the source of gamma or X-rays; and (θ3) to weight said pseudo-estimate with the calculated proportion of fortuitous time coincidences and to subtract it from two-dimensional or three-dimensional image of the source of gamma or X-rays.

9. A device according to claim 1, in which the first and second detectors are plane detectors.

10. A device according to claim 9, in which the first and second detectors are substantially parallel to each other and to said mask.

11. A device according to claim 1, in which the first and second detectors are pixelized semiconductor detectors.

12. A device according to claim 1, in which the first and second detectors are identical.

13. A device according to claim 1, in which the electronic processor means are also designed to determine the energy spectrum and the flux of the source by analyzing the selected electric pulses and the first and second images, over the entire spectrum range of the device.

14. A device according to claim 1, in which the coded mask comprises a set of tiles, each of the first and second detectors comprising a set of pixels, with the size of the smallest tiles in the mask being at least three times the size of the pixels in the first and second detectors.

* * * * *

UNITED STATES PATENT AND TRADEMARK OFFICE
CERTIFICATE OF CORRECTION

PATENT NO. : 8,354,648 B2  
APPLICATION NO. : 12/305811  
DATED : January 15, 2013  
INVENTOR(S) : Laurent et al.

Page 1 of 1

It is certified that error appears in the above-identified patent and that said Letters Patent is hereby corrected as shown below:

In the Specifications:

Column 7,  
Line 6, "resolution)" should read --resolution--.

Column 13,  
Lines 8 and 27, "localization I" should read --localization $\ell$--.

Signed and Sealed this  
Twenty-first Day of May, 2013

Teresa Stanek Rea  
*Acting Director of the United States Patent and Trademark Office*